(12) United States Patent
Lehmann

(10) Patent No.: US 8,606,438 B2
(45) Date of Patent: Dec. 10, 2013

(54) RAIL VEHICLE HAVING POWER LIMITER

(75) Inventor: Othmar Lehmann, Korb (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/254,866

(22) PCT Filed: Feb. 19, 2010

(86) PCT No.: PCT/EP2010/052132
§ 371 (c)(1),
(2), (4) Date: Sep. 6, 2011

(87) PCT Pub. No.: WO2010/100044
PCT Pub. Date: Sep. 10, 2010

(65) Prior Publication Data
US 2011/0315042 A1    Dec. 29, 2011

(30) Foreign Application Priority Data
Mar. 6, 2009    (DE) .................. 10 2009 012 052

(51) Int. Cl.
B61C 17/00    (2006.01)

(52) U.S. Cl.
USPC .......................... 701/19; 105/26.05

(58) Field of Classification Search
USPC ............ 701/19; 105/26.05; 318/432, 434, 52, 318/437
See application file for complete search history.

(56) References Cited

U.S. PATENT DOCUMENTS

| | | | | |
|---|---|---|---|---|
| 4,093,161 A | * | 6/1978 | Auer, Jr. ............................ | 246/5 |
| 5,239,472 A | * | 8/1993 | Long et al. ...................... | 701/20 |
| 5,346,163 A | * | 9/1994 | Momma et al. .................... | 246/5 |
| 5,924,653 A | * | 7/1999 | Pedersen et al. .......... | 246/167 R |
| 6,243,694 B1 | | 6/2001 | Bonissone et al. | |
| 2002/0174796 A1 | | 11/2002 | Kumar et al. | |
| 2003/0098012 A1 | | 5/2003 | Wild et al. | |
| 2006/0200437 A1 | | 9/2006 | Howlett et al. | |
| 2007/0142985 A1 | | 6/2007 | Kumar | |
| 2007/0225878 A1 | * | 9/2007 | Kumar et al. .................... | 701/19 |
| 2008/0201019 A1 | * | 8/2008 | Kumar et al. ................. | 700/286 |
| 2009/0234521 A1 | * | 9/2009 | Kumar et al. .................... | 701/19 |

FOREIGN PATENT DOCUMENTS

| | | | |
|---|---|---|---|
| CA | 2379775 A1 | | 2/2001 |
| DE | 1438782 A1 | | 9/1969 |
| DE | 69509398 T2 | | 11/1999 |
| DE | 19850051 A1 | | 5/2000 |
| DE | 19935351 A1 | | 2/2001 |
| EP | 0184339 | * | 8/1985 |
| EP | 0184339 A1 | | 6/1986 |
| RU | 2263810 C2 | | 11/2005 |
| WO | 03097424 A1 | | 11/2003 |
| WO | 2008097715 A2 | | 8/2008 |

* cited by examiner

OTHER PUBLICATIONS

Falko Advice, "Railenergy" Internet publication, 2008.

*Primary Examiner* — Thomas Black
*Assistant Examiner* — Shardul Patel
(74) *Attorney, Agent, or Firm* — Laurence A. Greenberg; Werner H. Stemer; Ralph E. Locher

(57) ABSTRACT

A rail vehicle includes a drive controller for providing required drive power for moving the rail vehicle forward. The drive controller is connected to a limiter module for limiting a drive power that can be demanded by a human-machine interface and the limiter module determines a maximum value for the drive power that can be demanded depending on running data of the rail vehicle.

5 Claims, 1 Drawing Sheet

RAIL VEHICLE HAVING POWER LIMITER

BACKGROUND OF THE INVENTION

Field of the Invention

The invention relates to a rail vehicle having a drive controller for producing drive power which is required for movement of the rail vehicle.

Rail vehicles, such as locomotives, multiple units, metros or trams, require power for driving, for example in the form of electricity or diesel fuels. This energy consumption represents a considerable cost factor for the operators. This energy is governed to a major extent by the drive power demanded by the drive system, which in turn is influenced to a not inconsiderable extent by the way in which the vehicle driver drives it.

Even in the case of rail vehicles, cost-oriented driving of the vehicle is expedient, so as to drive in as energy-saving a manner as possible.

In the case of automatic vehicles (equipped with ATC), a functionality by the name of "Coasting/Cruising" is offered. This functionality optimizes a turn while driving the automatically operated vehicle. The system referred to as "ATC" is available exclusively for automatic driving.

In the case of manual driving, there are solutions such as "Falko Advice", which provides a driver of the rail vehicle with advice of how he can drive the vehicle in an energy-saving manner, and at the same time still comply with his timetable. However, in this case, the vehicle driver is free to implement or else to ignore this advice. This results in acceptance difficulties by the vehicle driver. In addition, it is considerably disadvantageous that there is a further appliance, which has to be considered by the vehicle driver, thus intrinsically making it additionally more complex to drive the vehicle. The energy saving potential is therefore always dependent on the cooperation of the vehicle driver when using solutions such as "Falko Advice".

BRIEF SUMMARY OF THE INVENTION

Against this background, the invention is based on the object of further developing the initially mentioned rail vehicle in such a way as to promote more energy-saving driving.

This object is achieved in that the drive controller is connected to a limiter module for limiting a drive power which can be demanded via a man-machine interface, and the limiter module defines a maximum value for the drive power which can be demanded, depending on running data of the rail vehicle.

Energy can potentially be saved by the limiter module defining maximum values for the drive power which can be demanded, as a function of running data of the rail vehicle. For example, if the running data is in such a form that a low drive power level is sufficient to move the rail vehicle, this maximum value is reduced. This prevents an unnecessary large amount of drive power being demanded by a vehicle driver via the man-machine interface.

In this case, in particular, the running data may comprise data which reflects compliance with a timetable of the rail vehicle. For example, if the rail vehicle has been delayed on its timetable, the maximum value for the drive power which can be demanded can be increased or, in the opposite situation, a reduced drive power may be considered to be adequate.

In general, in the situation in which the running data reflects non-compliance with the timetable of the rail vehicle, the limiter module can adapt the maximum value for the drive power which can be demanded. This is always done in such a way as to achieve compliance with the timetable.

In principle, the limiter module can be arranged in any desired manner provided that this ensures that automatic action can be taken on the maximum drive power which can be demanded. In a first exemplary embodiment, the limiter module can be integrated in the drive controller. In the second exemplary embodiment, however, it is also possible for the limiter module to be in the form of an external appliance which acts via a vehicle bus on the drive controller or the man-machine interface.

Because the drive power that is produced is limited, the modification to the known rail vehicle by the invention is not highly safety-relevant, since the safety responsibility still remains with the vehicle driver and/or the already existing safety systems. The limiter module has the effect of the rail vehicle at most being moved more slowly than the vehicle driver desires, but never faster. This has the advantage that, in some circumstances, standard industrial components, which are not railroad-specific, can be used more easily, and less complex development processes can be used for implementation.

This results in a highly cost-efficient implementation for energy saving in the rail vehicle, in particular because the responsibility for the safety of the rail vehicle remains unchanged in comparison to the prior art with manual driving.

BRIEF DESCRIPTION OF THE SEVERAL VIEWS OF THE DRAWING

Exemplary embodiments of the invention will be explained in more detail in the following text with reference to the drawing, in which.

DESCRIPTION OF THE INVENTION

Figure 1:
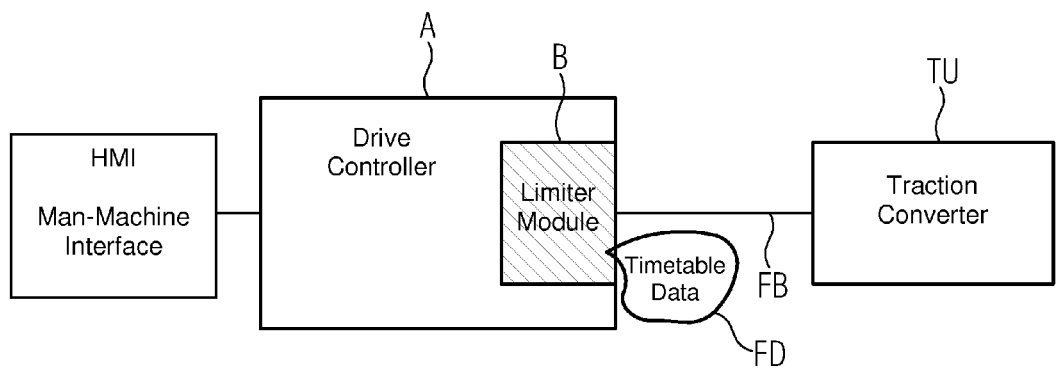
FIG. 1 shows a schematic block diagram illustration of a drive arrangement for a rail vehicle according to a first exemplary embodiment.

A drive controller A for a rail vehicle is shown in the center of the illustration in FIG. 1. The drive controller A is connected to a man-machine interface HMI, via which a vehicle driver demands drive power. A limiter module B is integrated in the drive controller A and in each case specifically limits the maximum drive power which can be demanded via the man-machine interface HMI for a driving situation.

The limiting module B is connected via a vehicle bus FB for example to a traction converter TU, in order to ensure respectively suitable limiting of the drive power which can be demanded.

For this purpose, the limiting module B is linked to timetable data FD which provides an indication of the extent to which the rail vehicle is currently complying with its timetable. For example, if the rail vehicle has been delayed, the limiter module B will make it possible to demand a greater maximum drive power than in the situation when compliance with the timetable is found.

Overall, the rail vehicle is therefore operated in the "normal" by the vehicle driver. An even maximum drive power which can be demanded is limited, to be precise depending on the drive power required to comply with the timetable.

Figure 2:
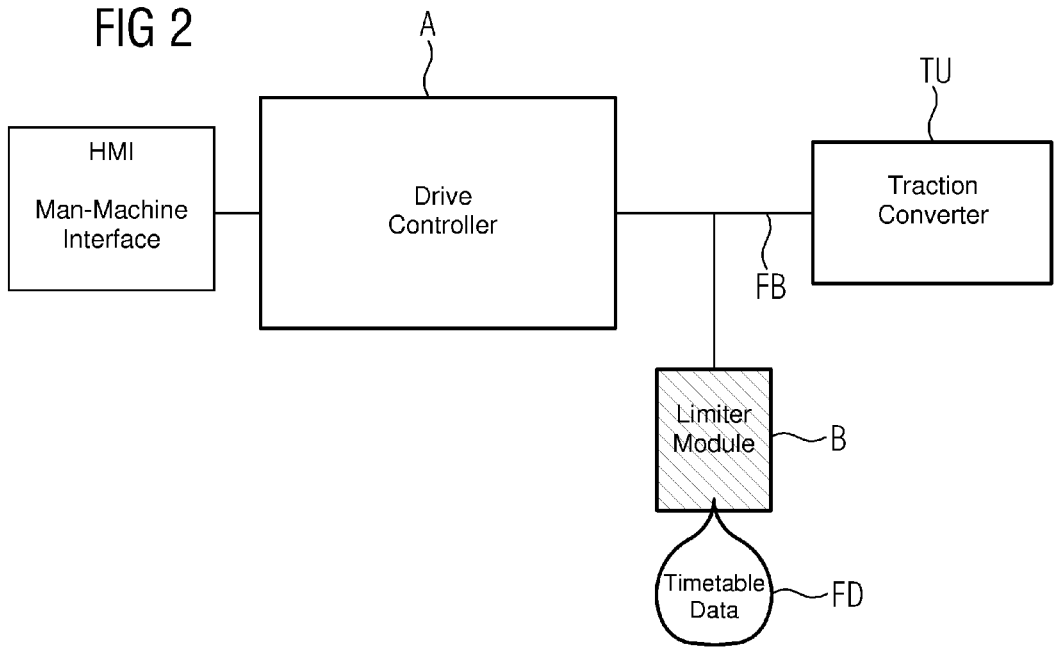
FIG. 2 shows a schematic block diagram illustration of a drive arrangement for a rail vehicle according to a second exemplary embodiment.

In the exemplary embodiment shown in FIG. 2, the general design of the drive arrangement is similar to that shown in FIG. 1.

In contrast to this, the only difference is that the limiter module B is not integrated in the drive controller A, but is connected as an external appliance to the vehicle bus FB. A data link to timetable data FB is likewise provided.

In both embodiments, the limiter module B ensures that the drive power demanded via the man-machine interface HMI is limited to a value which allows more economic operation of the rail vehicle.

It should be noted that the second alternative has the advantage that this allows existing drive arrangements to be easily retrofitted. All that is required is to link the limiter module B to the existing vehicle bus FB.

The invention claimed is:

1. A rail vehicle, comprising:
   a drive controller for providing drive power required for movement of the rail vehicle;
   a man-machine interface connected to said drive controller and configured to demand a drive power from said drive controller; and
   a limiter module connected to said drive controller for limiting said drive power able to be demanded by said man-machine interface, said limiter module defining a maximum value for said drive power, depending on running data of the rail vehicle, and said running data including data reflecting compliance with a timetable of the rail vehicle.

2. The rail vehicle according to claim 1, wherein said limiter module adapts the maximum value for the drive power able to be demanded, if said running data reflects non-compliance with the timetable of the rail vehicle.

3. The rail vehicle according to claim 1, wherein said limiter module is part of said drive controller.

4. The rail vehicle according to claim 1, wherein said limiter module is an external appliance acting through a vehicle bus on said drive controller or said man-machine interface.

5. A method for driving a rail vehicle, the method comprising the following steps:
   providing a drive controller for providing drive power required for movement of the rail vehicle;
   providing a man-machine interface connected to the drive controller for demanding the drive power from the drive controller;
   providing running data of the rail vehicle;
   computing a maximum value for the drive power depending on the running data;
   limiting the drive power able to be demanded via the man-machine interface to the maximum value; and
   demanding the drive power via the man-machine interface.

* * * * *